United States Patent
Iseki

(10) Patent No.: US 8,550,641 B2
(45) Date of Patent: Oct. 8, 2013

(54) MANUALLY RETRACTABLE VEHICLE DOOR MIRROR

(75) Inventor: Kota Iseki, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 275 days.

(21) Appl. No.: 12/961,979

(22) Filed: Dec. 7, 2010

(65) Prior Publication Data

US 2011/0141592 A1    Jun. 16, 2011

(30) Foreign Application Priority Data

Dec. 11, 2009   (JP) ................. 2009-281434

(51) Int. Cl.
*G02B 7/18*    (2006.01)

(52) U.S. Cl.
USPC .......................................... 359/841; 359/844

(58) Field of Classification Search
USPC ......................................................... 359/841
See application file for complete search history.

(56) References Cited

U.S. PATENT DOCUMENTS

| | | | |
|---|---|---|---|
| 6,132,050 A | 10/2000 | Sakata et al. | |
| 6,672,726 B1* | 1/2004 | Boddy et al. | 359/841 |
| 7,878,477 B2* | 2/2011 | Courbon | 248/478 |
| 2008/0297927 A1 | 12/2008 | Onuki | |
| 2009/0147388 A1 | 6/2009 | Mendoza | |
| 2010/0238570 A1* | 9/2010 | Reedman et al. | 359/841 |

FOREIGN PATENT DOCUMENTS

| | | |
|---|---|---|
| JP | 61-003756 | 1/1986 |
| JP | 62-189255 | 12/1987 |
| JP | 02-49753 U | 4/1990 |
| JP | 08-034288 | 2/1996 |
| JP | 08-216783 A | 8/1996 |
| JP | 2008-296719 | 12/2008 |
| JP | 2009-536118 | 10/2009 |

OTHER PUBLICATIONS

"Clutch," The Free Merriam-Webster Dictionary, http://www.merriam-webster.com/dictionary/clutch, Apr. 22, 2013.*
U.S. Appl. No. 12/961,820 to Kota Iseki, filed Dec. 7, 2010.
U.S. Appl. No. 12/961,911 to Kota Iseki, filed Dec. 7, 2010.
Japanese Office action, dated Jul. 2, 2013 along with an English translation thereof.

* cited by examiner

*Primary Examiner* — Jade R Chwasz
(74) *Attorney, Agent, or Firm* — Greenblum & Bernstein P.L.C.

(57) ABSTRACT

A manually retractable vehicle door mirror which can reduce the number of parts and improve efficiency of assembly operations as well as provide large bearing capacity at a location outwardly away from a shaft location to bear bending moments acting on a housing support member due to external forces. A housing support member is formed integrally with a shaft, annular wall, and a housing-support-member-side portion of a clutch, which are placed coaxially with a rotation axis. A housing is fixedly coupled to the housing support member. A base is formed integrally with a shaft passage hole, annular wall housing groove, and a base-side portion of a clutch, which are placed coaxially with a rotation axis. The shaft is rotatably inserted into the shaft passage hole, the annular wall is rotatably housed in the annular wall housing groove, and the housing support member is supported on the base in such a way as to be able to rotate around the rotation axis.

18 Claims, 10 Drawing Sheets

MANUALLY RETRACTABLE VEHICLE DOOR MIRROR

The disclosure of Japanese Patent Application No. JP2009-281434 filed on Dec. 11, 2009 including the specification, drawings, claims and abstract is incorporated herein by reference in its entirety.

BACKGROUND OF THE INVENTION

1. Field of the Invention

The present invention relates to a manually retractable vehicle door mirror in which a shaft is formed integrally with a housing support member or mirror rotating member in order to reduce the number of parts and improve efficiency of assembly operations as well as provide large bearing capacity at a location outwardly away from a location of the shaft to bear bending moments acting on the housing support member or mirror rotating member due to external forces.

2. Description of the Related Art

A conventional manually retractable vehicle door mirror is described in Japanese Patent Laid-Open No. 8-216783 (FIG. 5). The door mirror is configured as follows: a rotating shaft (54) is fixed upright to a base (50) attached to a door of a vehicle, a frame (58) is supported on the rotating shaft (54) in such a way as to be able to rotate around the axis of the rotating shaft (54), and a body (housing) (74) is fixedly supported on the frame (58) (the numbers in parentheses are reference numerals used in Japanese Patent Laid-Open No. 8-216783). Also, a conventional outside mirror for microbuses and trucks is described in Japanese Utility Model Laid-Open No. 2-49753 (FIG. 6). As shown in FIG. 17, the outside mirror is configured as follows: a base 10 is attached to a car body 2, a mirror (not shown) is supported on a pivot 22 at one end of a stay 20, and a support shaft 23 is formed at the other end of the stay 20, looking downward, and supported rotatably on the base 10.

The door mirror described in Japanese Patent Laid-Open No. 8-216783 requires the rotating shaft (54) as an independent part, increasing the number of parts and requiring a work process for assembling the rotating shaft (54) onto the base (50). The outside mirror described in Japanese Utility Model Laid-Open No. 2-49753, in which the support shaft 23 is integrated with the stay 20, requires a smaller number of parts. With this configuration, bending moments acting on the stay 20 due to external forces are borne by pressing abutment between an outer circumferential surface of the support shaft 23 and an inner circumferential surface of a passage hole 11b as well as by pressing abutment between an outer circumferential surface of the base 10 and an inner circumferential surface of an annular recess 21, where the abutting position of the latter two components is located outwardly away from the abutting position of the former two components.

SUMMARY OF THE INVENTION

The present invention is intended to provide a manually retractable vehicle door mirror in which a shaft is formed integrally with a housing support member or mirror rotating member in order to reduce the number of parts and improve efficiency of assembly operations as well as provide large bearing capacity at a location outwardly away from a location of the shaft to bear bending moments acting on the housing support member or mirror rotating member due to external forces.

The present invention provides a manually retractable vehicle door mirror comprising a base attached to an outer side of a car body, a housing support member rotatably supported on the base, and a housing, which being fixedly supported by the housing support member, moves between a retracted position (non-use position) and a return position (use position) by rotating together with the housing support member around a rotation axis of the housing support member, wherein: the housing support member has a structure in which a shaft, an annular wall, and a housing-support-member-side portion of a clutch are formed integrally, where the shaft is formed protruding downward on the rotation axis around which the shaft rotates relative to the base, the annular wall is formed coaxially with the shaft by protruding downward at a location outwardly away from the shaft, and the housing-support-member-side portion of the clutch is formed coaxially with the shaft by facing downward; the base has a structure in which a shaft passage hole, an annular wall housing groove, and a base-side portion of the clutch are formed integrally, where the shaft passage hole allows the shaft to be rotatably inserted therein, the annular wall housing groove is open upward to rotatably house the annular wall, and the base-side portion of the clutch is formed facing upward to restrain rotational movement of the housing support member by coming into abutting engagement with the housing-support-member-side portion of the clutch; on the back surface side of the base, a spring is fitted, in a compressed state, over the shaft protruding from the shaft passage hole, applying an urging force of the spring in such a direction along the rotation axis as to push the base and the housing support member toward each other and thereby bringing the housing-support-member-side portion and base-side portion of the clutch into pressing contact with each other; and when an external force is applied to the housing, increasing a bending moment acting on the housing support member, the annular wall and the annular wall housing groove come into pressing abutment with each other via inner wall surfaces and/or outer wall surfaces thereof to bear the external force. According to the present invention, the positions of the annular wall and the annular wall housing groove may be exchanged, placing the annular wall on the side of the base, and the annular wall housing groove on the side of the housing support member.

Also, the present invention provides a manually retractable vehicle door mirror comprising a base attached to an outer side of a car body, and a mirror rotating member which moves between a retracted position and a return position by being rotatably supported on the base, wherein: the mirror rotating member has a structure in which a housing, a shaft, an annular wall, and a mirror-rotating-member-side portion of a clutch are formed integrally, where the shaft is formed protruding downward on a rotation axis around which the shaft rotates relative to the base, the annular wall is formed coaxially with the shaft by protruding downward at a location outwardly away from the shaft, and the mirror-rotating-member-side portion of the clutch is formed coaxially with the shaft by facing downward; the base has a structure in which a shaft passage hole, an annular wall housing groove, and a base-side portion of the clutch are formed integrally, where the shaft passage hole allows the shaft to be rotatably inserted therein, the annular wall housing groove is open upward to rotatably house the annular wall, and the base-side portion of the clutch is formed facing upward to restrain rotational movement of the mirror rotating member by coming into abutting engagement with the mirror-rotating-member-side portion of the clutch; on the back surface side of the base, a spring is fitted, in a compressed state, over the shaft protruding from the shaft passage hole, applying an urging force of the spring in such a direction along the rotation axis as to push the base and the mirror rotating member toward each other and thereby bringing the mirror-rotating-member-side portion and base-side portion of the clutch into pressing contact with each other; and when an external force is applied to the housing, increasing a bending moment acting on the mirror rotating member, the annular wall and the annular wall housing groove come into pressing abutment with each other via inner wall surfaces and/or outer wall surfaces thereof to bear the external force. Again, the positions of the annular wall and the annular wall housing groove may be exchanged, placing the annular wall on the side of the base, and the annular wall housing groove on the side of the mirror rotating member.

According to the present invention, since the shaft is formed integrally with the housing support member or mirror rotating member, there is no need for a shaft as an independent part. This reduces the number of parts and thereby improves efficiency of assembly operations. In particular, if either the shaft, housing, and annular wall or the shaft, housing, and annular wall housing groove are formed integrally with the mirror rotating member, the number of parts can be reduced further. Besides, when an external force is applied to the housing, increasing a bending moment exerted on the housing support member or mirror rotating member and thereby causing the shaft to tilt, since the annular wall and the annular wall housing groove come into pressing abutment with each other via inner wall surfaces and/or outer wall surfaces thereof to bear the external force, large bearing capacity for the bending moment is obtained at a location outwardly away from the shaft location.

According to the present invention, the housing-support-member-side portion or mirror-rotating-member-side portion of the clutch as well as the base-side portion of the clutch can be placed on a radially inner side of the annular wall and annular wall housing groove. This eliminates the need for a exclusive radial width used for placing the clutch on a radially outer side of the annular wall and annular wall housing groove. Alternatively, the housing-support-member-side portion or the mirror-rotating-member-side portion of the clutch may be placed on the top of the annular wall and the base-side portion of the clutch may be placed in the bottom of the annular wall housing groove, or the housing-support-member-side portion or the mirror-rotating-member-side portion of the clutch may be placed in the bottom of the annular wall housing groove and the base-side portion of the clutch may be placed on the top of the annular wall. This eliminates the need for a exclusive radial width used for placing the clutch, making it possible to reduce the diameter needed for the base to rotate relative to the housing support member or mirror rotating member.

DETAILED DESCRIPTION OF THE PREFERRED EMBODIMENTS

First Embodiment

Figure 2:
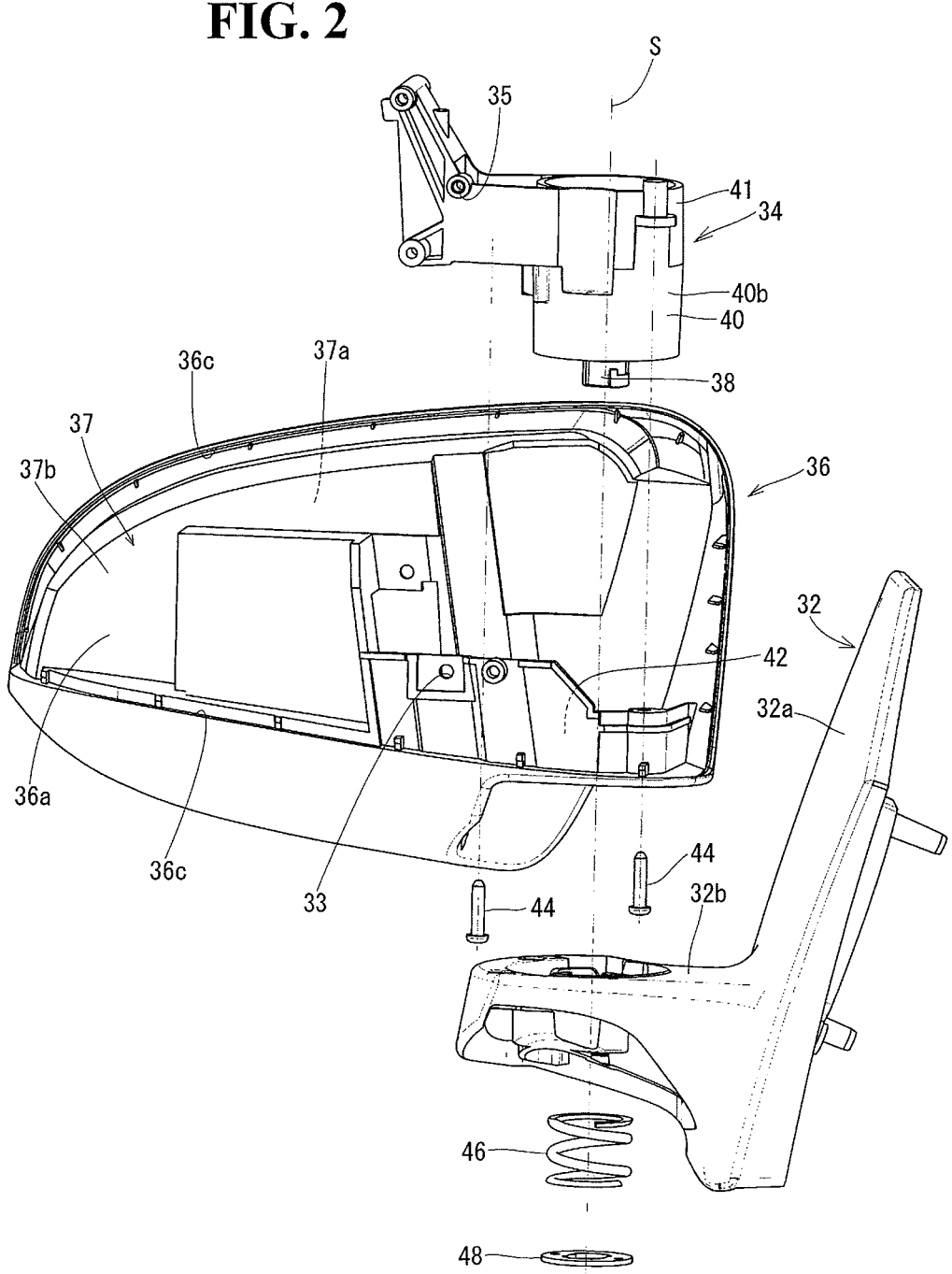
FIG. 2 is an exploded perspective view of principal part of the door mirror according to a first embodiment of the present invention.
Figure 7:
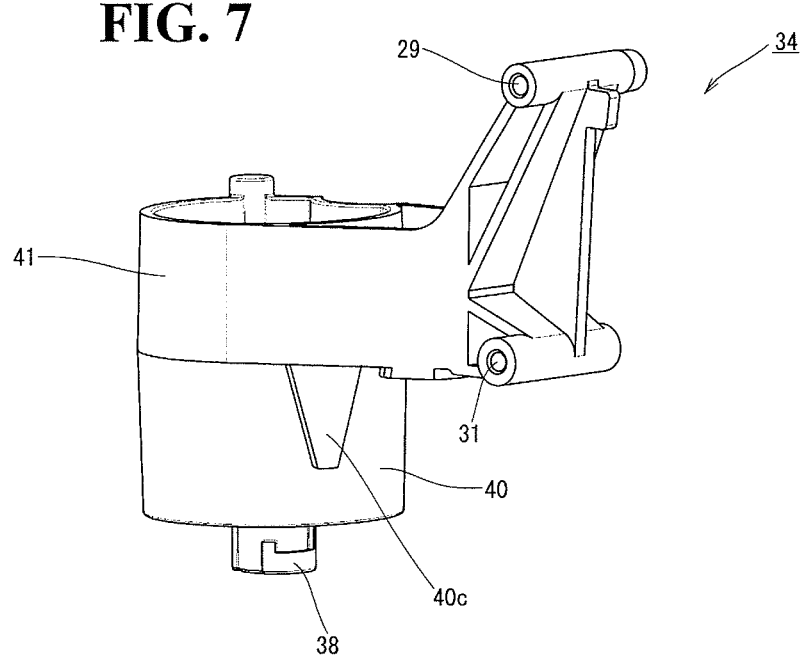
FIG. 7 is a perspective view of the housing support member 34 in FIG. 2 as viewed from the side on which a stopper 40c is formed.

A first embodiment of the present invention will be described. According to the first embodiment, an annular wall is placed on the side of a housing support member and an annular wall housing groove is placed on the side of a base. FIG. 2 is an exploded view showing a configuration of a manually retractable vehicle door mirror according to the first embodiment. This is a right door mirror as viewed from the rear. A housing cover mounted on the rear side of a housing (mirror body) 36, a mirror angle adjustment actuator fixedly placed in a front space 37a (FIG. 5) of the housing 36, a mirror plate fixedly supported by the mirror angle adjustment actuator in the state where the mirror angle can be adjusted, and so on are not shown in FIG. 2. The door mirror includes a base 32 attached to an outer side of a car body, a housing support member 34 (frame) bearing-supported on the base 32 in such a way as to be able to rotate around a rotation axis S, and a housing 36 fixedly supported by the housing support member 34. The housing 36 is fixedly supported to the housing support member 34 using screws 44 in the state where the housing support member 34 is housed in a depression 42 in an inner space 37. In so doing, a shaft 38 of the housing support member 34 and an annular wall 40 around the shaft 38 protrude downward from an undersurface of the housing 36. The shaft 38 and annular wall 40 are inserted, respectively, into a shaft passage hole 56 and annular wall housing groove 58 (FIG. 8) formed in a rotation support section 32b of the base 32, a coil spring 46 is fitted, in a shortened (compressed) state, over the shaft 38 from under the base 32, and a plate 48 is attached to a lower end of the shaft 38, thereby coupling the housing support member 34 and base 32 together. Consequently, the housing 36 can be moved among a retracted position (backward folded position), return position, and forward tilted position (forward folded position) by being rotated manually together with the housing support member 34 around the rotation axis S within an angular range permitted by a stopper 40c (FIG. 7).

Figure 1:
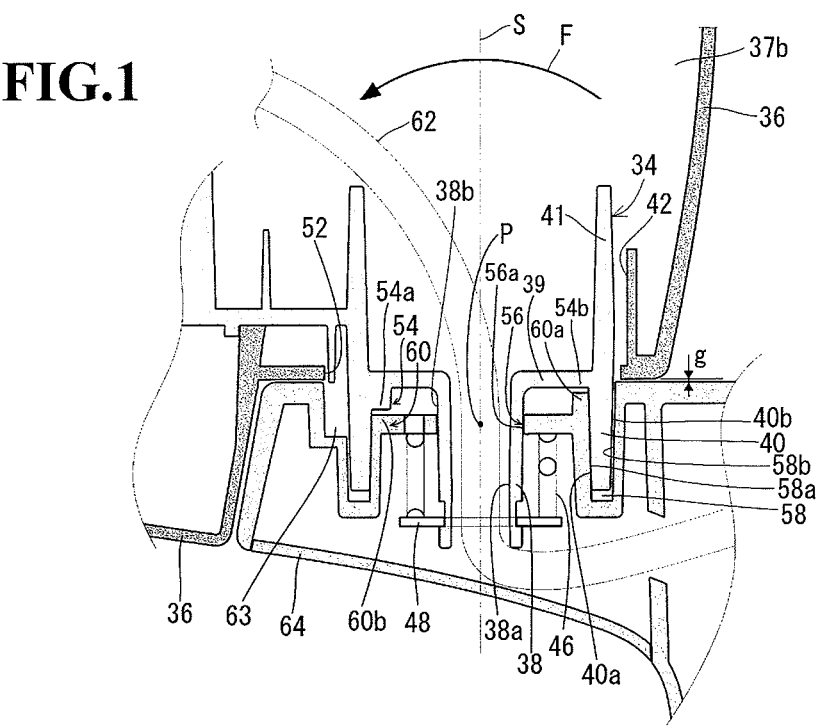
FIG. 1 is a partial sectional view (which corresponds to a cross section taken along line A-A in FIGS. 5 and 8) of a door mirror in FIG. 2 cut along a plane passing through a rotation axis S when a housing 36 is at a return position.
Figure 4:
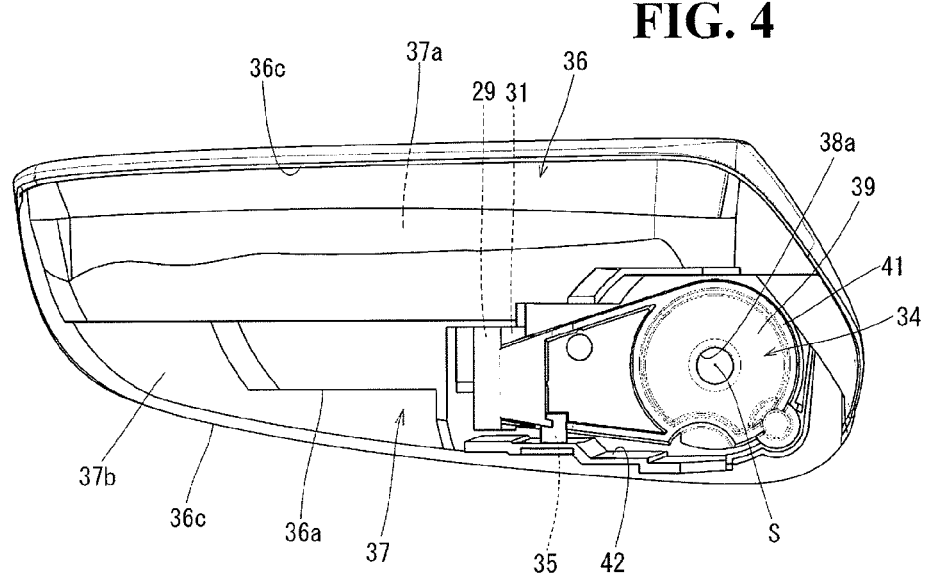
FIG. 4 is a plan view showing how a housing support member 34 is housed in a depression 42 in the housing 36 of the door mirror in FIG. 2.
Figure 5:
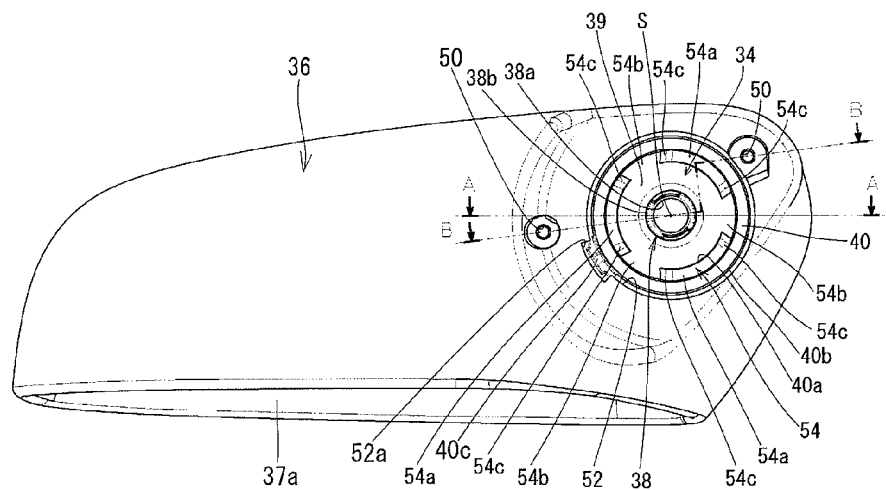
FIG. 5 is a bottom view of the assembled components shown in FIG. 4.
Figure 10:
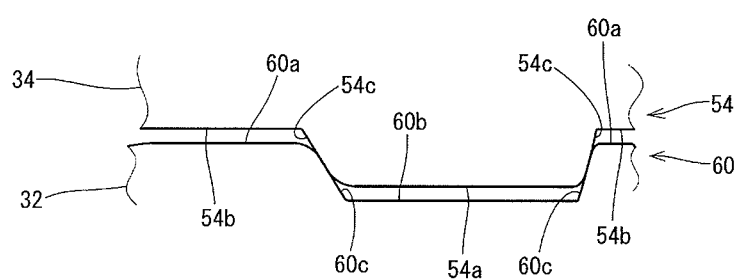
FIG. 10 is partially enlarged front view showing how a base-side portion 60 and housing-support-member-side portion 54 of a clutch are meshed with each other when the housing 36 of the door mirror in FIG. 2 is at a return position.

The housing support member 34, housing 36, and base 32 in FIG. 2 will be described. The housing support member 34 is a one-piece molding of rigid plastics such as PA+GF (glass fiber filled polyamide) resin or a one-piece casting of metal such as aluminum. As shown in FIG. 2, the housing support member 34 includes the shaft 38 which rotates relative to the base 32 by being shaped as a hollow round bar and placed on the rotation axis S, and the annular wall 40 which is circular in shape, located outwardly away from the shaft 38, and formed coaxially with the shaft 38 by being radially spaced from the shaft 38. Since the shaft 38 is formed integrally with the housing support member 34, there is no need for a shaft as an independent part. This reduces the number of parts and thereby improves efficiency of assembly operations. The annular wall 40 becomes slightly thinner in plate thickness toward the bottom (FIG. 1). The annular wall 40 protrudes upward beyond a disk-shaped coupler 39 (FIGS. 1 and 4) joining the annular wall 40 and shaft 38 and forms an annular wall extension 41. The annular wall extension 41 serves to increase rigidity of the annular wall 40. As shown in FIG. 1, in a space surrounded by the annular wall 40, coupler 39, and shaft 38, a housing-support-member-side portion 54 of a clutch is formed on a boundary between the coupler 39 and annular wall 40 (just inside the annular wall 40), being placed coaxially with the shaft 38 and annular wall 40. As shown in FIG. 5, the housing-support-member-side portion 54 of the clutch includes a ridge 54a and trough 54b repeated three times at equal intervals in a circumferential direction. Each boundary 54c between ridge 54a and trough 54b is formed to be an inclined surface (FIG. 10). As shown in FIG. 7, in some circumferential area on an outer circumferential surface of the annular wall 40, the stopper 40c is formed, protruding radially outward. Being placed in a stopper traveling groove 63 at a location just on the outer circumferential side of the annular wall housing groove 58 of the base 32 in FIG. 8, the stopper 40c moves along the stopper traveling groove 63 as the housing support member 34 rotates and is restrained by abutting against opposite ends 63a and 63b of the stopper traveling groove 63, where the stopper traveling groove 63 is formed in some circumferential area around the rotation axis S. The stopper 40c is restrained by the end 63a at the forward folded position of the housing 36 and restrained by the end 63b at the retracted position (backward folded position) of the housing 36. Since the stopper 40c is formed on the outer circumferential surface of the annular wall 40, the stopper 40c can be supported more firmly than when the stopper 40c is coupled to the housing support member 34 by its base alone without the annular wall 40. This prevents the stopper 40c from being broken. Conversely, the stopper traveling groove 63 may be formed at a location just on the inner circumferential side of the annular wall housing groove 58 and the stopper 40c may be formed on an inner circumferential surface of the annular wall 40, protruding therefrom. As shown in FIG. 7, on the front side of the housing support member 34, screw holes 29 and 31 are formed to screw and support part of the mirror angle adjustment actuator.

Figure 3:
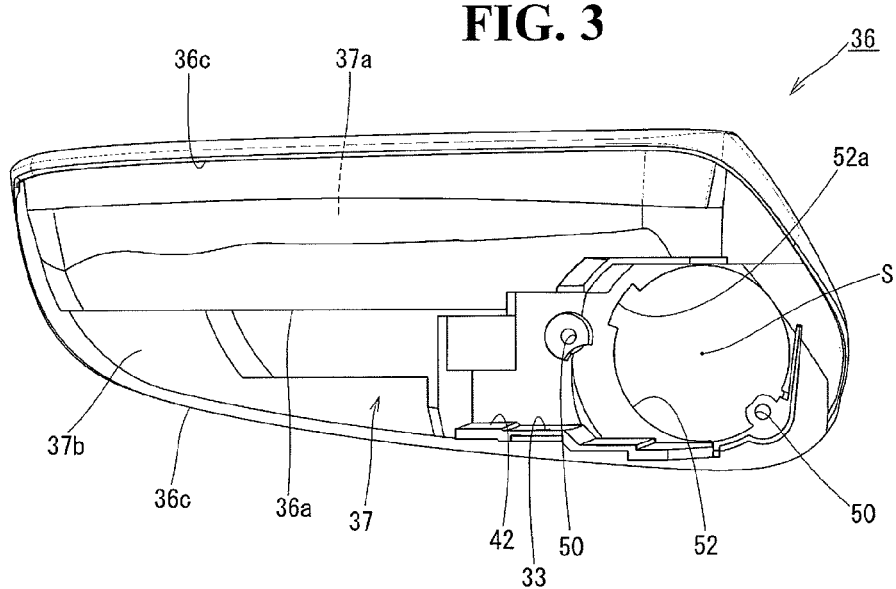
FIG. 3 is a plan view of the housing 36 alone of the door mirror in FIG. 2.

The housing 36 is a one-piece molding of plastics such as ABS lower in rigidity than the housing support member 34. As shown in FIG. 2, the inner space 37 of the housing 36 is generally partitioned by a partition plate 36a into the front space 37a and a rear space 37b. The mirror angle adjustment actuator (not shown) is housed in the front space 37a (FIG. 5) by being placed in front of the partition plate 36a. That is, part of the mirror angle adjustment actuator is secured with screws to screw holes (not shown) formed in a front face of the partition plate 36a while other part of the mirror angle adjustment actuator is secured with screws to the screw holes 29 and 31 (FIG. 7) in the front side of the housing support member 34. A mirror plate (not shown) is mounted on the mirror angle adjustment actuator. The depression 42 is formed in the rear space 37b, opening upward. The housing support member 34 is housed in the depression 42. A screw through-hole 33 (FIG. 2) is formed in the rear side of the housing 36. A screw (not shown) is inserted into the screw through-hole 33 and screwed into a screw hole 35 (FIG. 2) formed in the rear side of the housing support member 34. Consequently, the housing 36 and housing support member 34 are fastened to each other from the rear side as well. The rear space 37b of the housing 36 is closed by a housing cover (not shown) mounted thereon. A round hole 52 (FIG. 3) is formed on the rotation axis S in the bottom of the housing 36 to allow the shaft 38 of the housing support member 34 and the annular wall 40 to protrude. A recess 52a (FIGS. 3, 5 and 11) is formed in the round hole 52 to pass the stopper 40c (FIG. 7).

Figure 8:
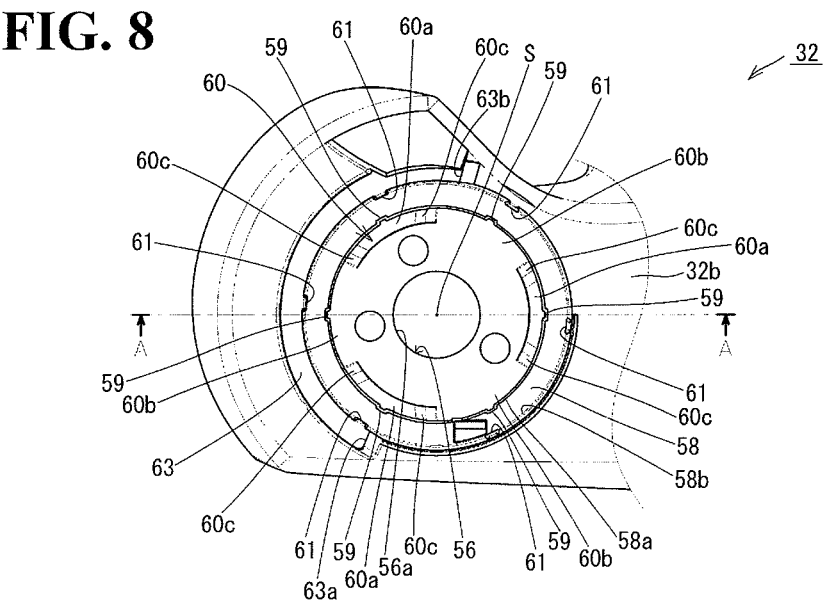
FIG. 8 is a plan view of a rotation support section 32b of a base 32 in FIG. 2.

The base 32 is a one-piece molding of rigid plastics such as PA+GF resin or a one-piece casting of metal such as aluminum. As shown in FIG. 2, the base 32 includes a car body fixing section 32a fastened to the car body and the rotation support section 32b which protrudes laterally from a lower end of the car body fixing section 32a and provides bearing support to rotatably support the housing support member 34. FIG. 8 shows the rotation support section 32b of the base 32 as viewed from above. The rotation support section 32b includes the shaft passage hole 56 formed on the rotation axis S, the annular wall housing groove 58 formed on the outer circumferential side of the shaft passage hole 56, and the clutch's base-side portion 60 formed coaxially with the annular wall housing groove 58 and the shaft passage hole 56 just on the inner circumferential side of the annular wall housing groove 58. The shaft passage hole 56 is designed to be just large enough to pass the shaft 38 with slight clearance when the housing 36 is at the return position. On an inner wall surface 58a and outer wall surface 58b of the annular wall housing groove 58, to define abutting positions with respect to an inner wall surface 40a and outer wall surface 40b (FIG. 1) of the annular wall 40, six ribs 59 or 61 each are formed in protrusion at equal circumferential angles, extending in a direction parallel to the rotation axis S. The annular wall housing groove 58 and annular wall 40 have such an inside diameter and outside diameter, respectively, that the inner wall surface 58a (positions of the ribs 59) and inner wall surface 40a as well as the outer wall surface 58b (positions of the ribs 61) and outer wall surface 40b will abut each other without clearance when the housing 36 is at the return position. Groove width of the annular wall housing groove 58 decreases slightly toward the bottom (FIG. 1) to suit changes in the plate thickness of the annular wall 40. Depth of the annular wall housing groove 58 is designed to be large enough for the housing-support-member-side portion 54 and base-side portion 60 of the clutch to always abut each other, within an angular range in which the housing support member 34 can rotate relative to the base 32. The base-side portion 60 of the clutch includes a ridge 60*a* and trough 60*b* repeated three times at equal intervals in a circumferential direction just on the inner circumferential side of the annular wall housing groove 58 (FIG. 8). Each boundary 60*c* between ridge 60*a* and trough 60*b* is formed to be an inclined surface (FIG. 10).

The door mirror in FIG. 2 is assembled, for example, as follows.

Figure 6:
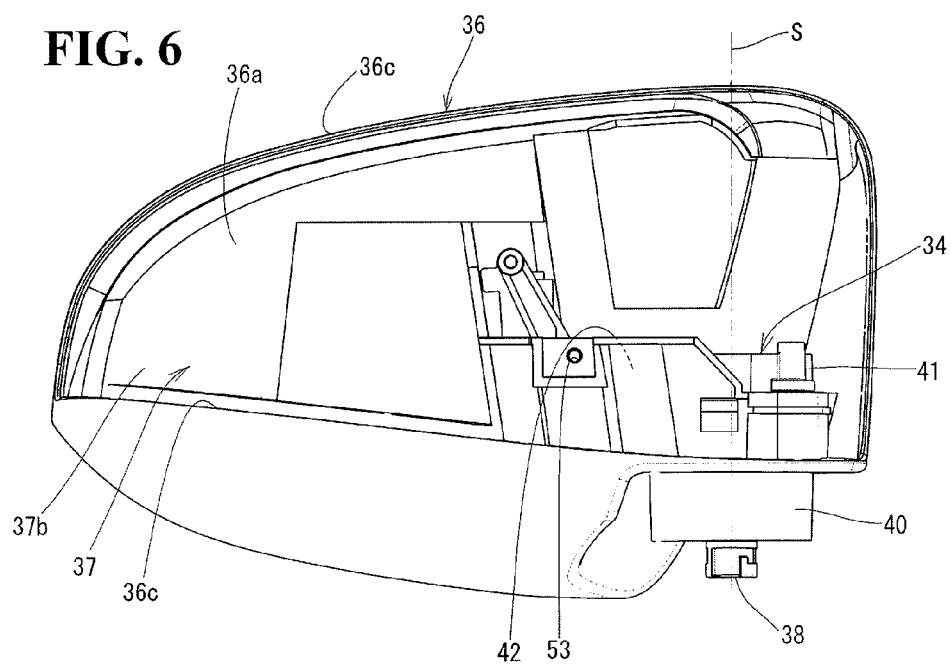
FIG. 6 is a rear view of the assembled components shown in FIG. 4.

(1) The housing support member 34 is housed in the depression 42 of the housing 36. FIGS. 4, 5 and 6 are a plan view, bottom view, and rear view showing the assembled components.

Figure 9:
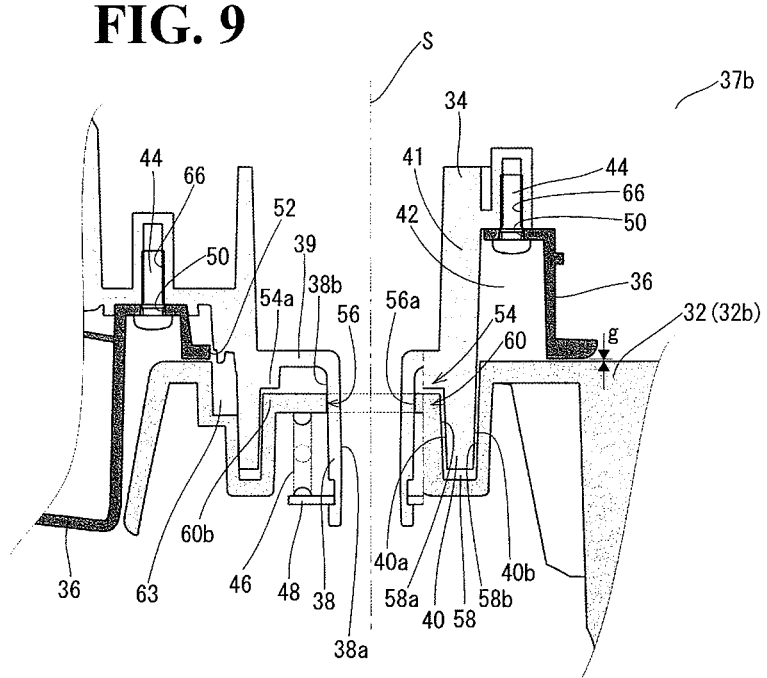
FIG. 9 is a partial sectional view (which corresponds to a cross section taken along line B-B in FIG. 5) of the housing support member 34 and housing 36 of the door mirror in FIG. 2, at a position where the components are fixedly coupled.

(2) Screws 44 (FIG. 2) are inserted through two screw through-holes 50 (FIG. 5) formed in the undersurface of the housing 36 and are screwed into the undersurface of the housing support member 34 to fixedly couple the housing 36 and housing support member 34 to each other. FIG. 9 shows a cross section (which corresponds to a cross section taken along line B-B in FIG. 5) taken at the position where the housing support member 34 and housing 36 are fixedly coupled. The housing support member 34 and housing 36 are fixedly coupled to each other as the screws 44 are inserted through the screw through-holes 50 formed in the housing 36 and screwed into screw holes 66 formed in the housing support member 34.

(3) The shaft 38 and annular wall 40 protruding downward from the round hole 52 in the undersurface of the housing 36 are rotatably inserted, respectively, into the shaft passage hole 56 and annular wall housing groove 58 (FIG. 8) formed in the rotation support section 32*b* of the base 32.

(4) The coil spring 46 is fitted over the shaft 38 protruding to the underside of the base 32, the plate 48 is attached to the lower end of the shaft 38, thereby compressing the coil spring 46 fitted around the shaft 38, and consequently the housing 36 is coupled to the base 32 for bearing support (FIG. 1) via the housing support member 34 in such a way as to be able to rotate around the rotation axis S.

(5) A screw (not shown) is inserted into the screw through-hole 33 (FIG. 2) in the rear side of the housing 36 and screwed into the screw hole 35 (FIG. 2) in the housing support member 34 to reinforce the coupling between the housing 36 and housing support member 34.

(6) The housing cover is attached to an opening (a region surrounded by edges 36*c* shown in FIGS. 2, 3, 4 and 6) in the back surface side of the housing 36. Consequently, the housing support member 34 excluding the shaft 38 and annular wall 40 protruding from the undersurface of the housing 36, i.e., part of the housing support member 34, which is above the coupler 39, has been housed in the inner space 37 of the housing 36.

(7) The mirror angle adjustment actuator is mounted in the front space 37*a* of the housing 36, and then the mirror plate is mounted on the mirror angle adjustment actuator to complete the assembly.

FIG. 1 shows the door mirror in FIG. 2 assembled and cut along a plane passing through the rotation axis S when the housing 36 is at the return position (corresponding to a cross section taken along line A-A in FIGS. 5 and 8). A harness 62 is passed through a hollow part 38*a* of the shaft 38 to supply electric drive power to the mirror angle adjustment actuator and the like. A lower opening of the base 32 is closed by a lid 64. When the housing 36 is at the return position, an urging force of the coil spring 46 acts to push the base 32 and the housing support member 34 toward each other along the rotation axis S, bringing the ridges 60*a* and troughs 60*b* of the base-side portion 60 (FIG. 8) of the clutch into mesh (state shown in FIG. 10) with the troughs 54*b* and ridges 54*a* of the housing-support-member-side portion 54 (FIG. 5). Consequently, the housing support member 34 with the housing 36 mounted is held in standing position on the base 32. In so doing, the inner wall surface 40*a* and outer wall surface 40*b* of the annular wall 40 come into abutment with the ribs 59 and 61 on the inner wall surface 58*a* and outer wall surface 58*b* of the annular wall housing groove 58, holding the housing 36 at the return position without wobble. There is slight clearance between an outer circumferential surface 38*b* of the shaft 38 and inner circumferential surface 56*a* of the shaft passage hole 56.

When the housing 36 is at the return position, if a force is applied manually to the housing 36 in a direction around the rotation axis S against the urging force of the coil spring 46, the inclined surface 54*c* (FIG. 10) of the housing-support-member-side portion 54 of the clutch slides upward along the inclined surface 60*c* of the base-side portion 60, causing the clutch to come out of mesh. As the inclined surface 54*c* slides upward, the housing support member 34 moves upward accordingly. Since the plate thickness of the annular wall 40 decreases slightly toward the bottom and the groove width of the annular wall housing groove 58 decreases slightly toward the bottom to suit changes in the plate thickness of the annular wall 40 (FIG. 1) as described above, when the housing support member 34 moves upward, the abutment of the inner wall surface 40*a* and outer wall surface 40*b* of the annular wall 40 with the ribs 59 and 61 on the inner wall surface 58*a* and outer wall surface 58*b* of the annular wall housing groove 58 is eased (clearance is created between the wall surfaces), allowing the housing 36 to rotate around the rotation axis S. Consequently, the housing 36 moves to the retracted position (backward folded position) or to the forward tilted position opposite the retracted position. When the housing 36 rotates, bearing support is provided by sliding of the inner wall surface 40*a* and outer wall surface 40*b* of the annular wall 40 along the inner wall surface 58*a* and outer wall surface 58*b* of the annular wall housing groove 58 and/or sliding of the outer circumferential surface 38*b* of the shaft 38 along the inner circumferential surface 56*a* of the shaft passage hole 56.

When the housing 36 is at the return position, if an unexpected force (e.g., a downward load) is applied to the housing 36, increasing a bending moment (a moment oriented in the direction indicated by arrow F, i.e., a moment around a center position P of the shaft passage hole 56 in FIG. 1) exerted on the housing support member 34, and thereby causing the housing support member 34 to tilt, the inner wall surface 40*a* and outer wall surface 40*b* of the annular wall 40 come into pressing abutment with the ribs 59 and 61 on the inner wall surface 58*a* and outer wall surface 58*b* of the annular wall housing groove 58 while the outer circumferential surface 38*b* of the shaft 38 comes into pressing abutment with the inner circumferential surface 56*a* of the shaft passage hole 56 due to tilting of the shaft 38, and consequently, the unexpected force is shared and borne by the three pairs of surfaces in pressing abutment. Therefore, the housing support member 34 provides high rigidity and high bearing capacity for external forces as a whole. Thus, even if the housing support member 34 is made of a one-piece molding of rigid plastics such as PA+GF resin instead of metal, it is possible to prevent the shaft 38 and annular wall 40 from being bent or broken. If each of the housing support member 34 and base 32 is made of a one-piece molding of rigid plastics such as PA+GF resin, the door mirror can be manufactured at low costs. According to the present embodiment, in particular, when the housing 36 is at the return position, since the inner wall surface 40*a* and outer wall surface 40*b* of the annular wall 40 abut the ribs 59 and 61 on the inner wall surface 58*a* and outer wall surface 58*b* of the annular wall housing groove 58 without clearance while the outer circumferential surface 38*b* of the shaft 38 and the inner circumferential surface 56*a* of the shaft passage hole 56 face each other with slight clearance, if an external force is applied to the housing 36, a large part of the external force is borne by the pressing abutment of the inner wall surface 40*a* and outer wall surface 40*b* of the annular wall 40 against the ribs 59 and 61 on the inner wall surface 58*a* and outer wall surface 58*b* of the annular wall housing groove 58 while the remaining part of the external force is borne by the pressing abutment between the outer circumferential surface 38*b* of the shaft 38 and the inner circumferential surface 56*a* of the shaft passage hole 56. This reduces the force applied to the shaft 38 and more reliably prevents the shaft 38 from being bent or broken.

According to the embodiment described above, since the annular wall 40 is hidden by being housed in the annular wall housing groove 58, the door mirror ensures appearance equivalent to that of conventional vehicle door mirrors. Also, in door mirrors, to prevent unusual sounds to be produced by rubbing opposing surfaces of the base 32 and housing 36 together when the housing 36 is rotated, a slight gap (about 0.5 mm; gap g shown in FIG. 1) is provided between the opposing surfaces of the base 32 and housing 36, but wind noise may be produced by an air flow entering the gap when the vehicle is traveling. However, according to the above embodiment, the annular wall 40 is placed such that a part of region in a vertical direction of its outer circumferential surface will face the gap g in some part, serving as a shield against the air flow entering the gap g. Thus, the annular wall 40 prevents the air flow from entering the gap g and offers a wind noise reduction effect. Also, according to the above embodiment, since the housing-support-member-side portion 54 and base-side portion 60 of the clutch are placed on the inner circumferential side of the annular wall 40 and annular wall housing groove 58, there is no need for a exclusive radial width (additional radial width provided, around the rotation axis S, on the housing support member 34 and base 32 in order to form the clutch) used for placing the clutch on the outer circumferential side of the annular wall 40 and annular wall housing groove 58. Also, the harness 62, which is passed through the hollow part 38*a* of the shaft 38, can be laid out easily. Besides, since the coil spring 46 is placed on the inner circumferential side of the annular wall housing groove 58, the coil spring 46 can be reduced in diameter.

Second Embodiment

Figure 11:
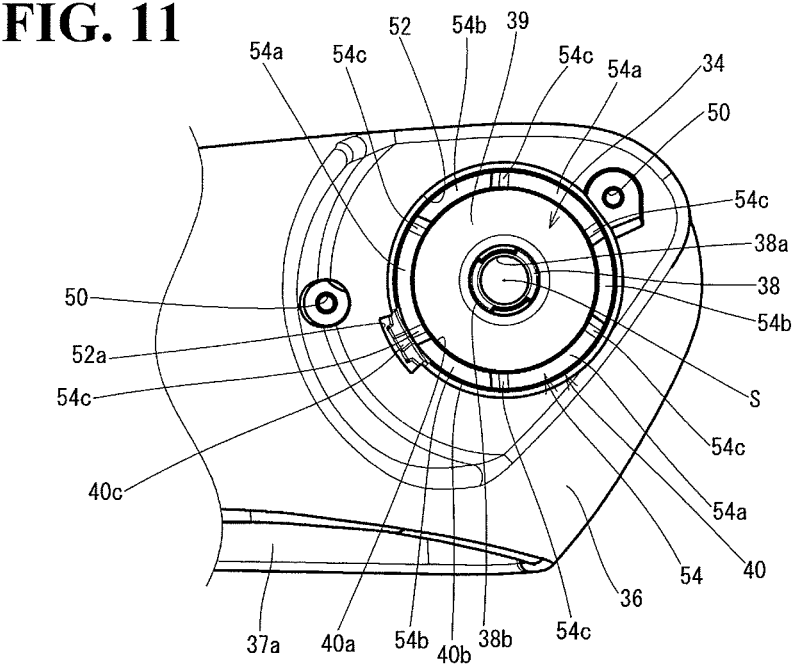
FIG. 11 is a diagram showing how the housing support member 34 is housed in the depression 42 in the housing 36 of a door mirror according to a second embodiment of the present invention as viewed from the bottom side of the housing 36.
Figure 12:
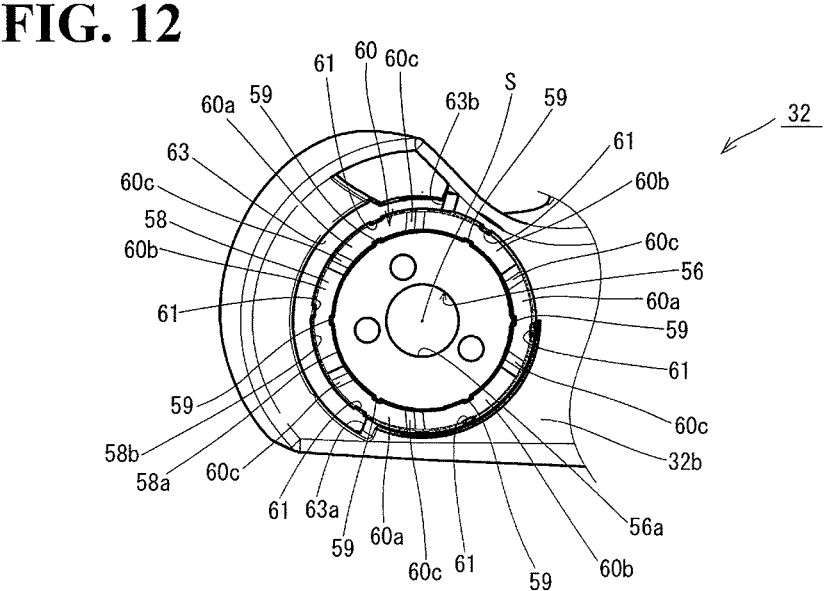
FIG. 12 is a plan view of the rotation support section 32b of the base 32 of the door mirror according to the second embodiment of the present invention.
Figure 13:
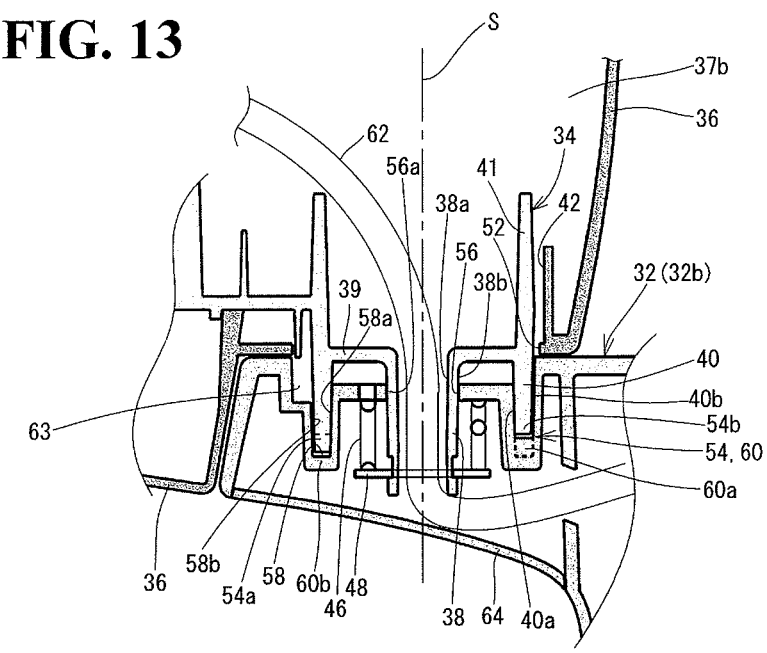
FIG. 13 is a partial sectional view of the door mirror according to the second embodiment of the present invention cut along a plane passing through the rotation axis S when the housing 36 is at a return position.

A second embodiment of the present invention is shown in FIGS. 11 to 13. According to the present embodiment, the housing-support-member-side portion 54 of the clutch is formed on the top of the annular wall 40 and the base-side portion 60 of the clutch is formed in the bottom of the annular wall housing groove 58. The rest of the configuration is the same as the first embodiment. FIG. 11 is a diagram showing how the housing support member 34 is placed (FIG. 4) in the depression 42 (FIG. 3) in the housing 36 as viewed from the bottom side of the housing 36 (FIG. 11 corresponds to FIG. 5 according to the first embodiment). FIG. 12 is a plan view of the rotation support section 32*b* of the base 32 (FIG. 12 corresponds to FIG. 8 according to the first embodiment). FIG. 13 is a sectional view taken along a plane passing through the rotation axis S when the housing 36 is at the return position (FIG. 13 corresponds to FIG. 1 according to the first embodiment). The same components as those in the first embodiment are denoted by the same reference numerals as the corresponding components in the first embodiment. The present embodiment eliminates the need for a exclusive radial width used for placing the clutch, making it possible to reduce the diameter needed for the base 32 to rotate relative to the housing support member 34. The door mirror according to the present embodiment operates in a manner similar to the door mirror according to the first embodiment.

Third Embodiment

Figure 14:
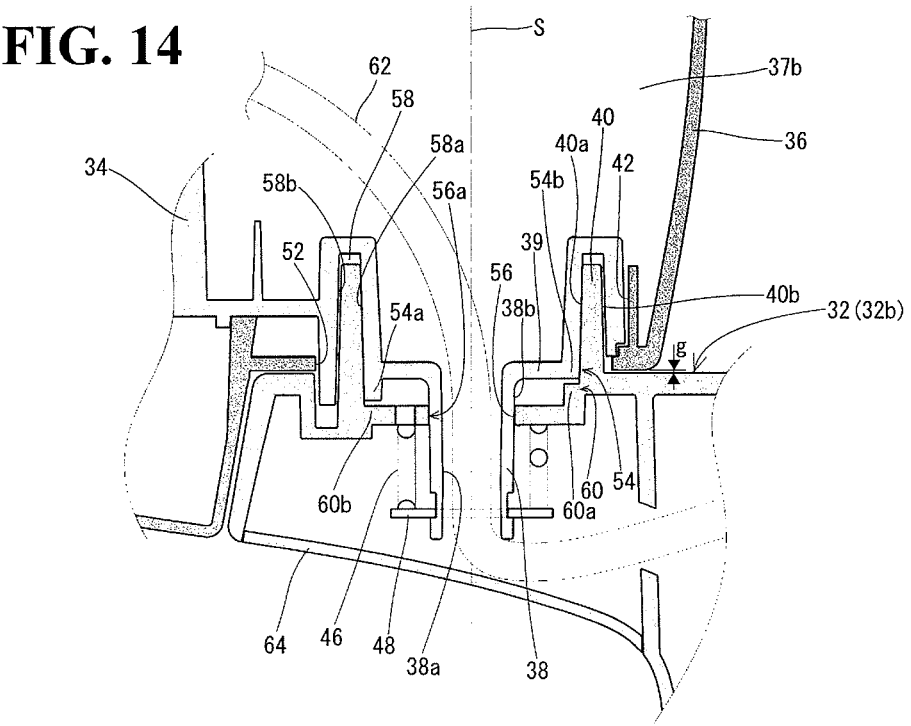
FIG. 14 is a partial sectional view of a door mirror according to a third embodiment of the present invention cut along a plane passing through the rotation axis S when the housing 36 is at a return position.

A third embodiment of the present invention is shown in FIG. 14. Conversely to the first embodiment, the annular wall 40 is formed on the side of the base 32 and the annular wall housing groove 58 is formed on the side of the housing support member 34. The rest of the configuration is the same as the first embodiment. FIG. 14 is a sectional view taken along a plane passing through the rotation axis S when the housing 36 is at the return position (FIG. 14 corresponds to FIG. 1 according to the first embodiment). The same components as those in the first embodiment are denoted by the same reference numerals as the corresponding components in the first embodiment. The annular wall 40 circular in shape is formed on the base 32 coaxially with the rotation axis S, protruding upward. The annular wall housing groove 58 circular in shape is formed on the housing support member 34 coaxially with the rotation axis S, opening downward. The shaft passage hole 56 passes the shaft 38 with slight clearance when the housing 36 is at the return position. The plate thickness of the annular wall 40 decreases slightly toward the upper end. The groove width of the annular wall housing groove 58 decreases slightly toward the upper end to suit changes in the plate thickness of the annular wall 40. On the inner wall surface 58*a* and outer wall surface 58*b* of the annular wall housing groove 58, to define abutting positions with respect to the inner wall surface 40*a* and outer wall surface 40*b* of the annular wall 40, six ribs each (similar to the ribs 59 and 61 in FIG. 8) are formed in protrusion at equal circumferential angles, extending in a direction parallel to the rotation axis S. The annular wall housing groove 58 and annular wall 40 are designed such that the inner wall surface 58*a* (positions of the ribs) and inner wall surface 40*a* as well as the outer wall surface 58*b* (positions of the ribs) and outer wall surface 40*b* will abut each other without clearance when the housing 36 is at the return position. Just on the inner circumferential side of the annular wall 40 and annular wall housing groove 58, the base 32 has a ridge 60*a* and trough 60*b* of the clutch's base-side portion 60 while the housing support member 34 has a trough 54*b* and ridge 54*a* of the clutch's housing-support-member-side portion 54. At the return position, the ridge 60*a* and trough 60*b* of the clutch's base-side portion 60 come into mesh, respectively, with the trough 54*b* and ridge 54*a* of the clutch's housing-support-member-side portion 54 (state shown in FIG. 10). This state is maintained by the urging force of the coil spring 46. The door mirror according to the present embodiment operates in a manner similar to the door mirror according to the first embodiment. Again, according to the present embodiment, the engagement between the annular wall 40 and annular wall housing groove 58 provides bearing capacity for the bending moment at a location outwardly away from the location of the shaft 38. Also, since the annular wall 40 is hidden by being housed in the annular wall housing groove 58, the door mirror ensures appearance equivalent to that of conventional vehicle door mirrors. Furthermore, the annular wall 40 serves as a shield against the air flow entering the gap g between opposing surfaces of the base 32 and housing 36 when the vehicle is traveling, and thereby prevents the air flow from entering the gap g and offers a wind noise reduction effect.

Fourth Embodiment

Figure 15:
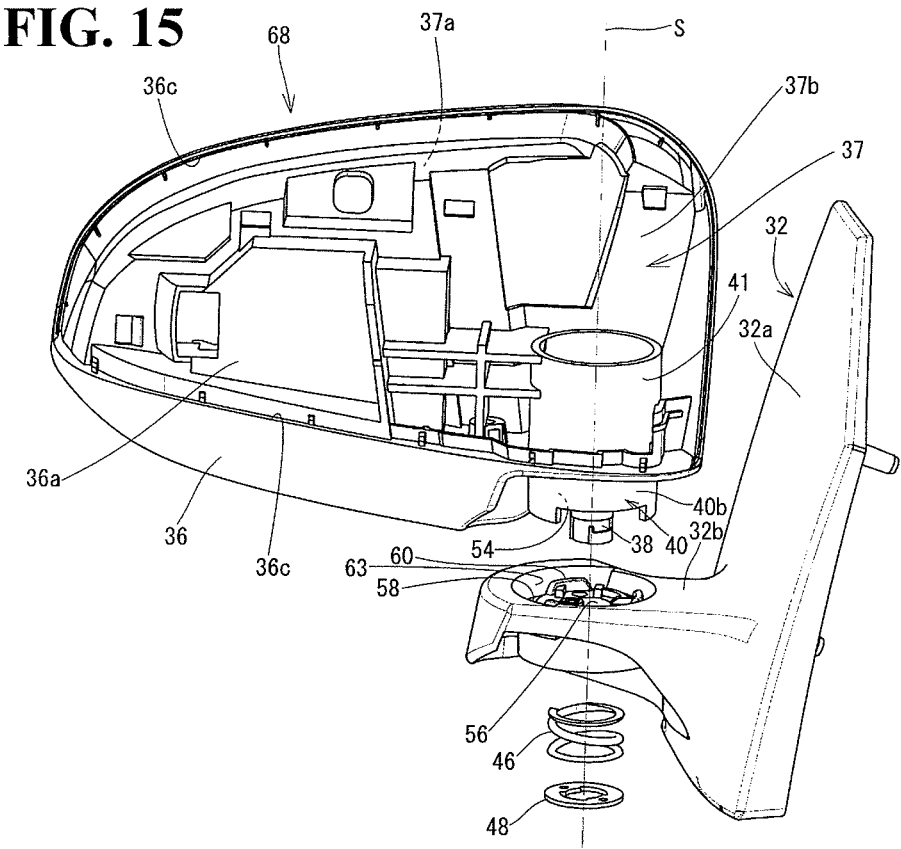
FIG. 15 is an exploded perspective view of principal part of a door mirror according to a fourth embodiment of the present invention.

A fourth embodiment of the present invention is shown in FIG. 15. According to the present embodiment, the housing support member 34 according to the first embodiment is integrated with the housing 36. The same components as those in the first embodiment are denoted by the same reference numerals as the corresponding components in the first embodiment. The whole of a mirror rotating member 68 is a one-piece molding of rigid plastics such as PA+GF resin. The mirror rotating member 68 has a structure in which the housing 36, shaft 38, annular wall 40, and mirror-rotating-member-side portion 54 of the clutch are formed integrally, where the shaft 38 is placed on the rotation axis S, the annular wall 40 is placed coaxially with the shaft 38 at a location outwardly away from the shaft 38, and the mirror-rotating-member-side portion 54 of the clutch is placed coaxially with the shaft 38. The rest of the configuration is the same as the first embodiment. A housing cover is mounted to the back surface side of the housing 36 to cover an opening (a region surrounded by the edges 36c) in the back surface side of the housing 36. The door mirror according to the present embodiment operates in a manner similar to the door mirror according to the first embodiment. The present embodiment can reduce the number of parts compared to the first embodiment (eliminates the need for an independent housing support member 34 and screws 44). Also, the present embodiment allows modifications similar to those in the second and third embodiments (the position of the clutch can be changed and the positions of the annular wall and the annular wall housing groove can be exchanged). Again, according to the present embodiment, the engagement between the annular wall 40 and annular wall housing groove 58 provides bearing capacity for the bending moment at a location outwardly away from the location of the shaft 38. Also, since the annular wall 40 is hidden by being housed in the annular wall housing groove 58, the door mirror ensures appearance equivalent to that of conventional vehicle door mirrors. Furthermore, the annular wall 40 serves as a shield against the air flow entering the gap g between opposing surfaces of the base 32 and housing 36 when the vehicle is traveling, and thereby prevents the air flow from entering the gap g and offers a wind noise reduction effect.

Although in the embodiments described above, the annular wall housing groove 58 and annular wall 40 are designed such that the inner wall surface 58a (positions of the ribs 59) and inner wall surface 40a as well as the outer wall surface 58b (positions of the ribs 61) and outer wall surface 40b will abut each other without clearance when the housing 36 is at the return position, only one of the pairs of wall surfaces may abut each other without clearance. Specifically, the inner wall surface 58a (positions of the ribs 59) and inner wall surface 40a may abut each other without clearance while the outer wall surface 58b (positions of the ribs 61) and outer wall surface 40b remain separated by clearance. Alternatively, the inner wall surface 58a (positions of the ribs 59) and inner wall surface 40a may remain separated by clearance while the outer wall surface 58b (positions of the ribs 61) and outer wall surface 40b abut each other without clearance. Even these configurations provide bearing capacity for the bending moment at a location outwardly away from the location of the shaft 38. Also, as with the embodiments described above, since the annular wall 40 is hidden by being housed in the annular wall housing groove 58, the door mirror ensures appearance equivalent to that of conventional vehicle door mirrors. Furthermore, the annular wall 40 serves as a shield against the air flow entering the gap g between opposing surfaces of the base 32 and housing 36 when the vehicle is traveling, and thereby prevents the air flow from entering the gap g and offers a wind noise reduction effect.

Although in the embodiments described above, the shaft 38 is passed through the shaft passage hole 56 with slight clearance when the housing 36 is at the return position, the shaft 38 may be passed without clearance. In that case, if an unexpected force is applied to the housing 36, a larger proportion of the unexpected force is borne by the shaft 38 than in the above embodiments. Alternatively, the shaft 38 may be passed through the shaft passage hole 56 with sufficiently large clearance. In that case, if an unexpected force is applied to the housing 36, the outer circumferential surface 38b of the shaft 38 and the inner circumferential surface 56a of the shaft passage hole 56 do not abut each other, and the entire unexpected force is borne by abutment between the inner wall surfaces 58a and 40a and/or abutment between the outer wall surfaces 58b and 40b of the annular wall housing groove 58 and the annular wall 40. Besides, although the coil spring 46 is used in the above embodiments, a disc spring (Belleville spring) or leaf spring may be used alternatively.

Figure 16:
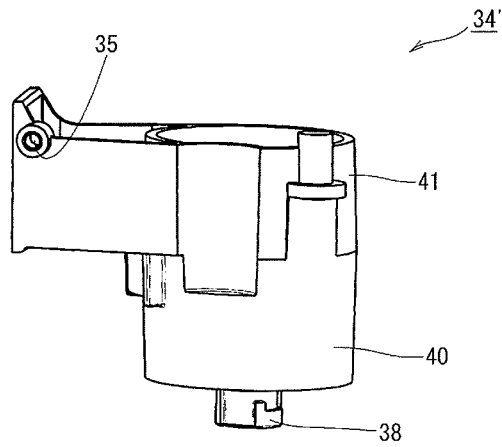
FIG. 16 is a perspective view showing another configuration example of a housing support member.
Figure 17:
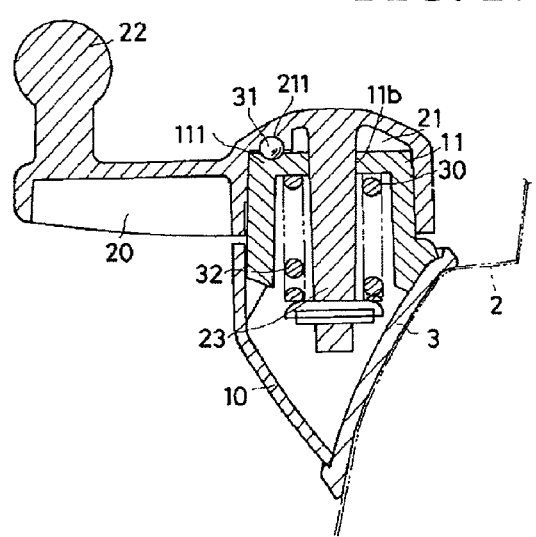
FIG. 17 is a sectional view showing a conventional apparatus described in Japanese Utility Model Laid-Open No. 2-49753.

With the configuration in FIG. 7, the screw holes 29 and 31 are formed in the front side of the housing support member 34 to support part of the mirror angle adjustment actuator with screws, but if the entire mirror angle adjustment actuator is screwed to the partition plate 36a (FIG. 2) in the front space 37a of the housing 36, there is no need to form the screw holes 29 and 31 in the housing support member 34. A configuration example of the housing support member 34 without holes 29 and 31 is shown in FIG. 16. A housing support member 34' is terminated near a location where the screw hole 35 is formed to couple the housing 36 and housing support member 34' from behind the housing 36, and the structure part in which to form the screw holes 29 and 31 in FIG. 7 has been removed.

What is claimed is:

1. A manually retractable vehicle door mirror comprising a base attached to an outer side of a car body, a housing support member rotatably supported on the base, and a housing, which being fixedly supported by the housing support member, moves between a retracted position and a return position by rotating together with the housing support member around a rotation axis of the housing support member, wherein:

the housing support member has a structure in which a shaft, an annular wall, and a housing-support-member-side portion of a clutch are formed integrally, where the shaft is formed protruding downward on the rotation axis around which the shaft rotates relative to the base, the annular wall is formed coaxially with the shaft by protruding downward at a location outwardly away from the shaft, and the housing-support-member-side portion of the clutch is formed coaxially with the shaft by facing downward;

the base has a structure in which a shaft passage hole, an annular wall housing groove, and a base-side portion of the clutch are formed integrally, where the shaft passage hole allows the shaft to be rotatably inserted therein, the annular wall housing groove is open upward to rotatably house the annular wall, and the base-side portion of the clutch is formed facing upward to restrain rotational movement of the housing support member by coming into abutting engagement with the housing-support-member-side portion of the clutch;

on the back surface side of the base, a coil spring is fitted, in a compressed state, over the shaft protruding from the shaft passage hole and is positioned on an inner circumferential side of the annular wall housing groove, applying an urging force of the coil spring in such a direction along the rotation axis as to push the base and the housing support member toward each other and thereby bringing the housing-support-member-side portion and base-side portion of the clutch into pressing contact with each other; and when an external force is applied to the housing, increasing a bending moment acting on the housing support member, the annular wall and the annular wall housing groove come into pressing abutment with each other via inner wall surfaces and/or outer wall surfaces thereof to bear the external force.

2. The manually retractable vehicle door mirror according to claim 1, wherein:

the base has a stopper traveling groove adjacent to an outer circumferential side or an inner circumferential side of the annular wall housing groove;

the housing support member or the mirror rotating member has a stopper protruding radially on the outer circumferential side or the inner circumferential side of the annular wall; and the stopper is moved along the stopper traveling groove as the housing support member or the mirror rotating member rotates and is restrained by abutting against an end of the stopper traveling groove.

3. The manually retractable vehicle door mirror according to claim 1, wherein when the housing is at the return position, the annular wall and the annular wall housing groove face each other without clearance between inner wall surfaces thereof and/or without clearance between outer wall surfaces thereof while an outer circumferential side of the shaft and an inner circumferential side of the shaft passage hole face each other with slight clearance, and in this state, if an external force is applied to the housing, increasing a bending moment acting on the housing support member or the mirror rotating member, the outer circumferential side of the shaft and the inner circumferential side of the shaft passage hole come into pressing abutment with each other to bear part of the external force.

4. The manually retractable vehicle door mirror according to claim 1, wherein the housing-support-member-side portion or the mirror-rotating-member-side portion of the clutch as well as the base-side portion of the clutch are placed on a radially inner side of the annular wall and annular wall housing groove.

5. The manually retractable vehicle door mirror according to claim 1, wherein the housing-support-member-side portion or the mirror-rotating-member-side portion of the clutch is placed on the top of the annular wall and the base-side portion of the clutch is placed in the bottom of the annular wall housing groove, or the housing-support-member-side portion or the mirror-rotating-member-side portion of the clutch is placed in the bottom of the annular wall housing groove and the base-side portion of the clutch is placed on the top of the annular wall.

6. A manually retractable vehicle door mirror comprising a base attached to an outer side of a car body, a housing support member rotatably supported on the base, and a housing, which being fixedly supported by the housing support member, moves between a retracted position and a return position by rotating together with the housing support member around a rotation axis of the housing support member, wherein:

the housing support member has a structure in which a shaft, an annular wall housing groove, and a housing-support-member-side portion of a clutch are formed integrally, where the shaft is formed protruding downward on the rotation axis around which the shaft rotates relative to the base, the annular wall housing groove is formed coaxially with the shaft by opening downward at a location outwardly away from the shaft, and the housing-support-member-side portion of the clutch is formed coaxially with the shaft by facing downward;

the base has a structure in which a shaft passage hole, an annular wall, and a base-side portion of the clutch are formed integrally, where the shaft passage hole allows the shaft to be rotatably inserted therein, the annular wall is formed protruding upward and rotatably housed in the annular wall housing groove, and the base-side portion of the clutch is formed facing upward to restrain rotational movement of the housing support member by coming into abutting engagement with the housing-support-member-side portion of the clutch;

on the back surface side of the base, a coil spring is fitted, in a compressed state, over the shaft protruding from the shaft passage hole and is positioned on an inner circumferential side of the annular wall housing groove, applying an urging force of the coil spring in such a direction along the rotation axis as to push the base and the housing support member toward each other and thereby bringing the housing-support-member-side portion and base-side portion of the clutch into pressing contact with each other; and when an external force is applied to the housing, increasing a bending moment acting on the housing support member, the annular wall and the annular wall housing groove come into pressing abutment with each other via inner wall surfaces and/or outer wall surfaces thereof to bear the external force.

7. The manually retractable vehicle door mirror according to claim 6, wherein when the housing is at the return position, the annular wall and the annular wall housing groove face each other without clearance between inner wall surfaces thereof and/or without clearance between outer wall surfaces thereof while an outer circumferential side of the shaft and an inner circumferential side of the shaft passage hole face each other with slight clearance, and in this state, if an external force is applied to the housing, increasing a bending moment acting on the housing support member or the mirror rotating member, the outer circumferential side of the shaft and the inner circumferential side of the shaft passage hole come into pressing abutment with each other to bear part of the external force.

8. The manually retractable vehicle door mirror according to claim 6, wherein the housing-support-member-side portion or the mirror-rotating-member-side portion of the clutch as well as the base-side portion of the clutch are placed on a radially inner side of the annular wall and annular wall housing groove.

9. The manually retractable vehicle door mirror according to claim 6, wherein the housing-support-member-side portion or the mirror-rotating-member-side portion of the clutch is placed on the top of the annular wall and the base-side portion of the clutch is placed in the bottom of the annular wall housing groove, or the housing-support-member-side portion or the mirror-rotating-member-side portion of the clutch is placed in the bottom of the annular wall housing groove and the base-side portion of the clutch is placed on the top of the annular wall.

10. A manually retractable vehicle door mirror comprising a base attached to an outer side of a car body, and a mirror rotating member which moves between a retracted position and a return position by being rotatably supported on the base, wherein:

the mirror rotating member has a structure in which a housing, a shaft, an annular wall, and a mirror-rotating-member-side portion of a clutch are formed integrally, where the shaft is formed protruding downward on a rotation axis around which the shaft rotates relative to the base, the annular wall is formed coaxially with the shaft by protruding downward at a location outwardly away from the shaft, and the mirror-rotating-member-side portion of the clutch is formed coaxially with the shaft by facing downward;

the base has a structure in which a shaft passage hole, an annular wall housing groove, and a base-side portion of the clutch are formed integrally, where the shaft passage hole allows the shaft to be rotatably inserted therein, the annular wall housing groove is open upward to rotatably house the annular wall, and the base-side portion of the clutch is formed facing upward to restrain rotational movement of the mirror rotating member by coming into abutting engagement with the mirror-rotating-member-side portion of the clutch;

on the back surface side of the base, a coil spring is fitted, in a compressed state, over the shaft protruding from the shaft passage hole and is positioned on an inner circumferential side of the annular wall housing groove, applying an urging force of the coil spring in such a direction along the rotation axis as to push the base and the mirror rotating member toward each other and thereby bringing the mirror-rotating-member-side portion and base-side portion of the clutch into pressing contact with each other; and when an external force is applied to the housing, increasing a bending moment acting on the mirror rotating member, the annular wall and the annular wall housing groove come into pressing abutment with each other via inner wall surfaces and/or outer wall surfaces thereof to bear the external force.

11. The manually retractable vehicle door mirror according to claim 10, wherein:

the base has a stopper traveling groove adjacent to an outer circumferential side or an inner circumferential side of the annular wall housing groove;

the housing support member or the mirror rotating member has a stopper protruding radially on the outer circumferential side or the inner circumferential side of the annular wall; and the stopper is moved along the stopper traveling groove as the housing support member or the mirror rotating member rotates and is restrained by abutting against an end of the stopper traveling groove.

12. The manually retractable vehicle door mirror according to claim 10, wherein when the housing is at the return position, the annular wall and the annular wall housing groove face each other without clearance between inner wall surfaces thereof and/or without clearance between outer wall surfaces thereof while an outer circumferential side of the shaft and an inner circumferential side of the shaft passage hole face each other with slight clearance, and in this state, if an external force is applied to the housing, increasing a bending moment acting on the housing support member or the mirror rotating member, the outer circumferential side of the shaft and the inner circumferential side of the shaft passage hole come into pressing abutment with each other to bear part of the external force.

13. The manually retractable vehicle door mirror according to claim 10, wherein the housing-support-member-side portion or the mirror-rotating-member-side portion of the clutch as well as the base-side portion of the clutch are placed on a radially inner side of the annular wall and annular wall housing groove.

14. The manually retractable vehicle door mirror according to claim 10, wherein the housing-support-member-side portion or the mirror-rotating-member-side portion of the clutch is placed on the top of the annular wall and the base-side portion of the clutch is placed in the bottom of the annular wall housing groove, or the housing-support-member-side portion or the mirror-rotating-member-side portion of the clutch is placed in the bottom of the annular wall housing groove and the base-side portion of the clutch is placed on the top of the annular wall.

15. A manually retractable vehicle door mirror comprising a base attached to an outer side of a car body, and a mirror rotating member which moves between a retracted position and a return position by being rotatably supported on the base, wherein:

the mirror rotating member has a structure in which a housing, a shaft, an annular wall housing groove, and a mirror-rotating-member-side portion of a clutch are formed integrally, where the shaft is formed protruding downward on a rotation axis around which the shaft rotates relative to the base, the annular wall housing groove is formed coaxially with the shaft by opening downward at a location outwardly away from the shaft, and the mirror-rotating-member-side portion of the clutch is formed coaxially with the shaft by facing downward;

the base has a structure in which a shaft passage hole, an annular wall, and a base-side portion of the clutch are formed integrally, where the shaft passage hole allows the shaft to be rotatably inserted therein, the annular wall is formed protruding upward and rotatably housed in the annular wall housing groove, and the base-side portion of the clutch is formed facing upward to restrain rotational movement of the mirror rotating member by coming into abutting engagement with the mirror-rotating-member-side portion of the clutch;

on the back surface side of the base, a coil spring is fitted, in a compressed state, over the shaft protruding from the shaft passage hole and is positioned on an inner circumferential side of the annular wall housing groove, applying an urging force of the coil spring in such a direction along the rotation axis as to push the base and the mirror rotating member toward each other and thereby bringing the mirror-rotating-member-side portion and base-side portion of the clutch into pressing contact with each other; and when an external force is applied to the housing, increasing a bending moment acting on the mirror rotating member, the annular wall and the annular wall housing groove come into pressing abutment with each other via inner wall surfaces and/or outer wall surfaces thereof to bear the external force.

16. The manually retractable vehicle door mirror according to claim 15, wherein when the housing is at the return position, the annular wall and the annular wall housing groove face each other without clearance between inner wall surfaces thereof and/or without clearance between outer wall surfaces thereof while an outer circumferential side of the shaft and an inner circumferential side of the shaft passage hole face each other with slight clearance, and in this state, if an external force is applied to the housing, increasing a bending moment acting on the housing support member or the mirror rotating member, the outer circumferential side of the shaft and the inner circumferential side of the shaft passage hole come into pressing abutment with each other to bear part of the external force.

17. The manually retractable vehicle door mirror according to claim 15, wherein the housing-support-member-side portion or the mirror-rotating-member-side portion of the clutch as well as the base-side portion of the clutch are placed on a radially inner side of the annular wall and annular wall housing groove.

18. The manually retractable vehicle door mirror according to claim 15, wherein the housing-support-member-side portion or the mirror-rotating-member-side portion of the clutch is placed on the top of the annular wall and the base-side portion of the clutch is placed in the bottom of the annular wall housing groove, or the housing-support-member-side portion or the mirror-rotating-member-side portion of the clutch is placed in the bottom of the annular wall housing groove and the base-side portion of the clutch is placed on the top of the annular wall.

* * * * *